UNITED STATES PATENT OFFICE 2,291,528

HALOMETHYL ETHERS

Herman A. Bruson and Clinton W. MacMullen, Philadelphia, Pa., assignors to Röhm & Haas Company, Philadelphia, Pa., a corporation of Delaware No Drawing. Application October 15, 1941,
Serial No. 415,036

9 Claims. (Cl. 260—613)

This invention relates to ethers which contain at least one aromatic nucleus which has one or more halomethyl groups attached directly to a carbon atom of the ring. It relates further to a process for preparing these ethers. More particularly, it relates to the preparation of nuclear halomethyl substituted aromatic ethers having the general formula $$(hal-CH_2)_n-R-X-A-Y$$

wherein hal is a member of the group consisting of chlorine and bromine, $n$ is an integer less than three, R is a carbocyclic aromatic radical, X is a member of the group consisting of O and S, A is an alkylene group, the chain of which may be interrupted by a member of the group consisting of O and S, and Y is a member of the group consisting of —OH, —O—alkyl, —O—aryl, —OCO—alkyl, —OCO—aryl, —CO—alkyl, —CO—aryl, —COO—alkyl, —COOH, and —CH$_2$hal.

These halomethyl compounds may be prepared by condensing an ether of the general formula R—X—A—Y with formaldehyde and hydrogen chloride or hydrogen bromide. The reaction takes place readily in concentrated hydrochloric or hydrobromic acid solution at temperatures of about 10–60° C. without splitting the ether linkages. The compounds thus obtained may be used in the preparation of wetting agents, resins, insecticides, mothproofing agents, tanning materials, and other industrial products.

Typical ethers which are suitable for the preparation of these new halomethyl compounds are the following:

R—O—CH$_2$CH$_2$Cl
R—S—CH$_2$CH$_2$Cl
R—O—CH$_2$CH$_2$—O—R
R—S—CH$_2$CH$_2$—S—R
R—O—CH$_2$CH$_2$OH
R—O—CH$_2$COOH
R—O—CH$_2$COO—alkyl (C$_1$ to C$_{18}$)
R—O—CH$_2$CH$_2$O—CO—alkyl (C$_1$ to C$_{17}$)
R—O—CH$_2$CH$_2$O—CO—aryl
R—O—CH$_2$COR'
R—O—CH$_2$COCH$_3$
R—O—CH$_2$COC$_6$H$_5$
R—O—(CH$_2$)$_n$COR' and compounds containing the radical R—O—A— in which A is a polyalkylene ether group, such as R—O—CH$_2$CH$_2$—O—CH$_2$CH$_2$—O—R
R—O—CH$_2$CH$_2$—S—CH$_2$CH$_2$Cl
R—O—CH$_2$CH$_2$—S—CH$_2$CH$_2$—O—R
R—O—CH$_2$CH$_2$—O—CH$_2$CH$_2$Cl
R—O—CH$_2$CH$_2$—O—CH$_2$CH$_2$COR'
R—O—CH$_2$CH$_2$—O—CH$_2$CH$_2$—O—CH$_2$CH$_2$Cl
R—(O—CH$_2$CH$_2$)$_y$—OH; where $y=1$ to 10 inclusive
R—O—CH$_2$CH$_2$—O—CH$_2$CH$_2$—O—alkyl (C$_1$ to C$_{18}$)
R—(O—CH$_2$CH$_2$)$_y$—O—alkyl
R—O—CH$_2$CH$_2$—O—CH$_2$CH$_2$—O—CH$_2$CH$_2$—O—R
R—O—CH$_2$CH$_2$—O—CH$_2$CH$_2$—O—COR' (R' being alkyl or aryl)

in which R is an aromatic residue, which may contain other nuclear substituents such as alkyl, aralkyl, cycloalkyl, aryl, nitro, halogen, acyl groups, etc. but must be free of radicals or groups which are destroyed by the hydrogen halide or the formaldehyde. Such groups are, for example, the amino, diazo, and aldehyde groups. It must also be free of hydroxyl groups which would cause condensation of the formaldehyde in a different manner. These aromatic radicals must have at least one replaceable nuclear hydrogen atom and, in case more than one is available, more than one (hal—CH$_2$)— group can be introduced into the aromatic radical. The aromatic radical may be mononuclear or polynuclear such as a benzene, naphthalene, phenanthrene, anthracene, or other polynuclear radical.

The reaction is carried out in general by suspending the aryl ether in the aqueous hydrohalogen acid containing the formaldehyde and passing in dry hydrogen halide at temperatures of about 10 to 60° C. The aryl ether may also be dissolved in a suitable non-reactive organic solvent such as petroleum ether, ethylene dichloride, etc. The formaldehyde may be used in the form of an aqueous solution or as paraformaldehyde. The products obtained are usually low-melting solids or thick oils.

This invention may be illustrated by the following examples. It is not limited, however, to the exact conditions of time, temperature, and reagents shown as it may be otherwise practiced within the scope of the appended claims.

*Example 1*

A stream of dry hydrogen chloride was passed into a mixture of 100 grams of phenoxyethoxyethyl chloride, 102 grams of 37% formaldehyde, and 300 cc. of concentrated hydrochloric acid for 8 hours at a temperature of about 30° C., the reaction mass being stirred throughout this period. A light brown oil formed which was separated, dissolved in benzene and washed with ice water. The benzene solution was dried with anhydrous sodium sulphate, filtered, and the solvent evaporated in vacuo, leaving 116 grams of oil which on cooling changed to a white solid. This material was purified by distillation in vacuo. It boiled at 210–215° C./5 mm. and the distillate solidified to a crystalline mass which on recrystallization from petroleum ether was obtained in the form of white crystals having a melting point of 52–54° C. The determination of chlorine content showed it to be di(chloromethyl) phenoxyethoxyethyl chloride having the probable formula:

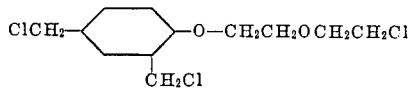

*Example 2*

A mixture of 156 grams of phenoxyethyl chloride, 500 grams of 30% formaldehyde, and 500 cc. of concentrated hydrochloric acid was heated at 45–55° C. and stirred vigorously while a stream of dry hydrogen chloride was passed in for 8 hours. The semi-solid material was purified by washing with cold methyl alcohol. The white crystalline solid obtained, having a melting point of 60–62° C. was di(chloromethyl) phenoxyethyl chloride having the probable formula:

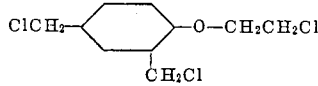

*Example 3*

A mixture of 122 grams of phenoxyethoxyethyl chloride, 102 grams of 37% formaldehyde, and 300 cc. of concentrated hydrochloric acid was stirred vigorously and a stream of dry hydrogen chloride was passed into the mixture for 8 hours at 30–33° C. A light brown oil separated which was dissolved in benzene, washed with ice water, the solution dried with anhydrous sodium sulphate, filtered, and the benzene evaporated in vacuo. The residue was a clear, light brown oil weighing 136 grams. A chlorine determination showed this to be di-(chloromethyl) phenoxyethoxyethoxyethyl chloride having the formula:

(ClCH₂)₂—C₆H₃—O—CH₂CH₂—
O—CH₂CH₂—O—CH₂CH₂Cl

*Example 4*

A mixture of 44 grams of β-chloroethoxyethyl phenyl sulphide, ClC₂H₄O—C₂H₄S—C₆H₅, 65 grams of 37% formaldehyde, and 200 cc. of concentrated hydrochloric acid was heated at 50–60° C. and stirred vigorously while a stream of dry hydrogen chloride was passed through the mixture for 10 hours. A brown oil layer separated which was dissolved in benzene, washed, dried, and the solvent removed in vacuo. 50 grams of a clear, brown oil remained which was chloromethyl-phenyl β-chloroethoxyethyl sulphide having the formula:

Cl—CH₂C₆H₄S—C₂H₄O—C₂H₄Cl

*Example 5*

A mixture of 118 grams of o-chlorophenoxyethoxyethyl chloride, 90 grams of 37% formaldehyde, and 300 cc. of concentrated hydrochloric acid was heated at 50–60° C. and stirred vigorously while a stream of dry hydrogen chloride was passed through the mixture for 18 hours. A brown oil separated which was washed and dried as described above. On evaporation of the solvent a clear, light brown oil weighing 126 grams remained. This was chloromethyl o-chlorophenoxyethoxyethyl chloride having the probable formula:

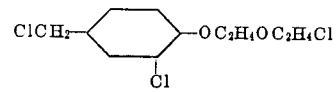

*Example 6*

A mixture of 131 grams of o-sec-octyl phenoxyethoxyethoxyethyl chloride, 60 grams of 37% formaldehyde, and 300 cc. of concentrated hydrochloric acid was heated at 50–60° C. while a stream of dry hydrogen chloride passed in for about 20 hours. The product was isolated as described above. The light brown oil was o-sec-octyl chloromethyl phenoxyethoxyethoxyethyl chloride having the formula:

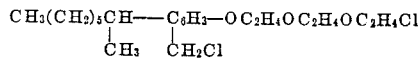

In a similar manner dodecyl phenoxyethoxyethyl chloride was converted to its chloromethyl derivative which is a pale yellow oil.

*Example 7*

A mixture of 160 grams of p-phenyl phenoxyethoxyethoxyethyl chloride, 142 grams of 37% formaldehyde, and 300 cc. of concentrated hydrochloric acid was heated at 50–60° C. and stirred while a stream of dry hydrogen chloride was passed in for 10 hours. 151 grams of a dark brown oil was isolated in the usual manner. This product was chloromethyl p-phenyl phenoxyethoxyethoxyethyl chloride.

*Example 8*

81.6 grams of p-cyclohexyl phenoxyethoxyethyl chloride, 41 grams of 37% formaldehyde, and 200 cc. of concentrated hydrochloric acid were heated at 50–60° C. and a stream of dry hydrogen chloride passed in for 11 hours. A clear, dark brown oil weighing 68 grams was isolated as described above. The product obtained was p-cyclohexyl chloromethyl phenoxyethoxyethoxyethyl chloride having the probable formula:

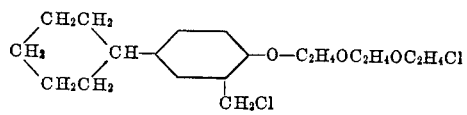

*Example 9*

83.6 grams of p-benzyl phenoxyethoxyethoxyethyl chloride, 81 grams of 37% formaldehyde, and 200 cc. of concentrated hydrochloric acid were heated at 40–50° C. and a stream of dry hydrogen chloride passed in for 8 hours. The clear brown oil, separated as described above, was chloromethyl p-benzyl phenoxyethoxyethyl chloride.

Example 10

A mixture of 136.8 grams of dodecyl methyl phenoxyethoxyethoxyethyl chloride, 60 grams of 37% formaldehyde, and 300 cc. of concentrated hydrochloric acid was heated at 50–60° C. and a stream of dry hydrogen chloride passed in for 27 hours. The red brown oil, isolated as described above, was chloromethyl dodecyl methyl phenoxyethoxyethoxyethyl chloride having the probable formula:

$$C_{12}H_{25}\!-\!C_6H_2(CH_3)(CH_2Cl)\!-\!O\!-\!C_2H_4\!-\!O\!-\!C_2H_4\!-\!O\!-\!C_2H_4Cl$$

Example 11

A mixture of 156 grams of p-ter-octyl phenoxyethoxyethyl chloride, 30 grams of paraformaldehyde, and 150 grams of ethylene dichloride was stirred while a stream of dry hydrogen chloride was passed in for 17 hours at about 30° C. A red oil layer separated which was washed with cold water, dried with anhydrous sodium sulphate, filtered, and the ethylene dichloride distilled off in vacuo. A clear, brown oil weighing 137 grams was obtained. The product was p-ter-octyl-chloromethyl phenoxyethoxyethyl chloride having the probable formula:

ter–$C_8H_{17}$–C$_6$H$_3$(CH$_2$Cl)–OC$_2$H$_4$OC$_2$H$_4$Cl

Example 12

A mixture of 178.4 grams of p-ter-octyl phenoxyethoxyethoxyethyl chloride, 41 grams of 37% formaldehyde, 300 cc. of concentrated hydrochloric acid, and 12 grams of powdered anhydrous zinc chloride was stirred and cooled at about 0° C. while a stream of dry hydrogen chloride passed through the mixture for about 6 hours. This mixture was poured onto ice and the product extracted with benzene. The benzene solution was washed with ice water, dried, filtered, and the solvent removed in vacuo. The clear pale yellow oil remaining was chloromethyl- p-ter-octyl phenoxyethoxyethoxyethyl chloride.

Example 13

A mixture of 32 grams of o-phenyl phenoxyethanol, 75 grams of 30% formaldehyde, and 90 cc. of concentrated hydrochloric acid was heated at 35–50° C. and a stream of dry hydrogen chloride passed in for 7 hours. The product was isolated in the usual manner. It was an oil which on analysis was found to be di(chloromethyl)-o-phenyl phenoxyethanol.

Example 14

A mixture of 76 grams of phenoxy acetic acid, 90 grams of 37% formaldehyde, and 300 cc. of concentrated hydrochloric acid was heated at 50–60° C. and a stream of dry hydrogen chloride passed in for 6½ hours. A viscous mass separated which was washed and dried on a porous plate. Analysis showed the product to be di(chloromethyl) phenoxyacetic acid.

Example 15

A mixture of 90 grams of phenoxy ethyl acetate, 90 grams of 37% formaldehyde, and 300 cc. of concentrated hydrochloric acid was stirred while a stream of dry hydrogen chloride was passed in for 7 hours at 30–40° C. A resinous mass was obtained which was washed and dried on a porous plate. Analysis indicated it to be the dichloromethyl derivative of phenoxy ethyl acetate.

Example 16

A mixture of 46 grams of o-nitro phenoxyethoxyethyl chloride, 41 grams of 37% formaldehyde, and 200 cc. of concentrated hydrochloric acid was stirred while a stream of dry hydrogen chloride passed in at 30–60° C. for about 8 hours. A brown oil separated which was purified in the usual manner. The product obtained was chloromethyl o-nitro phenoxyethoxyethyl chloride having the probable formula:

$$ClCH_2\!-\!C_6H_3(NO_2)\!-\!OC_2H_4\!-\!OC_2H_4Cl$$

Example 17

A mixture of 80 grams of p-cyclohexyl phenoxyethoxyethyl n-butyl ether, 51 grams of 37% formaldehyde, and 200 cc. of concentrated hydrochloric acid was stirred while a stream of dry hydrogen chloride was passed in at 30–50° C. for 7 hours. A clear yellow oil was obtained which was chloromethyl p-cyclohexyl phenoxyethoxyethyl n-butyl ether having the probable formula:

$$C_6H_{11}C_6H_3(CH_2Cl)\,OC_2H_4OC_2H_4OC_4H_9$$

Example 18

A mixture of 156 grams of p-ter-octyl phenoxyethoxyethyl chloride, 30 grams of paraformaldehyde, and 150 grams of petroleum ether (B. P. 30–60° C.) was stirred while a stream of dry hydrogen chloride was passed in for 16 hours at 30–60° C. The turbid brown solution was washed with cold water, dried with anhydrous sodium sulphate, filtered, and the solvent distilled off in vacuo. A brown oil remained which was chloromethyl p-ter-octyl phenoxyethoxyethyl chloride.

Example 19

A mixture of 26 grams of phenoxyethoxyethoxyethyl sulphide, 41 grams of 37% formaldehyde, and 200 cc. of concentrated hydrochloric acid was vigorously stirred while a stream of dry hydrogen chloride was passed in for about 8 hours without heating or cooling. A very viscous layer separated which was washed and dried on a porous plate. The brown elastic mass was tetra(chloromethyl) - phenoxyethoxyethoxyethyl sulphide having the probable formula:

ClCH$_2$–C$_6$H$_3$(CH$_2$Cl)–O–C$_2$H$_4$OC$_2$H$_4$OC$_2$H$_4$–S–C$_2$H$_4$OC$_2$H$_4$OC$_2$H$_4$O–C$_6$H$_3$(CH$_2$Cl)–CH$_2$Cl

Example 20

A mixture of 104 grams of butyl phenoxy acetate, 90 grams of 37% formaldehyde, and 300 cc. of concentrated hydrochloric acid was stirred while a stream of dry hydrogen chloride was passed in for 7 hours without heating or cooling. A yellow layer formed which was dissolved in benzene, washed, dried, and the benzene removed in vacuo. A clear yellow oil remained which was butyl dichloromethyl phenoxy acetate having the probable formula:

ClCH$_2$–C$_6$H$_3$(CH$_2$Cl)–OCH$_2$COOC$_4$H$_9$

Example 21

A mixture of 87.5 grams of phenoxyethoxyethyl dodecyl ether, 61 grams of 37% formaldehyde, and 200 cc. of concentrated hydrochloric acid was stirred while a stream of dry hydrogen chloride was passed in without heating or cooling for 11 hours. The oil layer which separated was purified as described above. The product was a clear amber oil which was di(chloromethyl)-phenoxyethoxyethyl dodecyl ether having the probable formula:

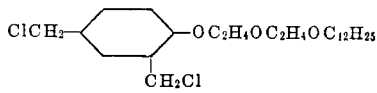

The bromo-methyl and di(bromomethyl) derivatives of compounds of the above type may be obtained by replacing the hydrogen chloride with hydrogen bromide. In some cases the aryl polyalkylene ether halides give resinous products which are difficult to isolate. o-Methoxy phenoxyethoxyethyl chloride gives a viscous concentrate analyzing for the dichloromethyl derivative. β-Naphthoxy-ethoxyethyl chloride when treated with formaldehyde and hydrochloric acid yields a resinous chloromethyl derivative.

Example 22

A mixture of 125 grams of diisobutyl phenoxy ethanol, 182 grams of 37% aqueous formaldehyde, and 200 grams of concentrated hydrochloric acid was stirred and saturated with gaseous hydrogen chloride at 40–50° C. for 8 hours. The oil layer was taken up in benzene, washed with ice water, dried, and the solvent evaporated off under reduced pressure. The clear, yellow oil obtained was chloromethyl diisobutyl phenoxy ethanol.

Example 23

A mixture of 138 g. of phenoxy ethanol, 406 grams of 37% aqueous formaldehyde, and 200 grams of concentrated hydrochloric acid was stirred and saturated with gaseous hydrogen chloride at 30–60° C. for 5 hours and at 15° C. for 2 hours. The oil layer was taken up in benzene, washed, dried, and the solvent removed under reduced pressure. The viscous, clear, light amber oil obtained was chloromethyl phenoxy ethanol containing some dichloromethyl phenoxy ethanol.

Example 24

A mixture of 97 grams of diethylene glycol di-(diisobutyl o-cresyl) ether

100 grams of 37% aqueous formaldehyde, and 200 grams of concentrated hydrochloric acid was stirred and saturated with gaseous hydrogen chloride at 60–70° C. for 16 hours. The oil layer was taken up in benzene, washed, dried, and the solvent removed in vacuo. About 30% conversion to chloromethyl diethylene glycol di-(diisobutyl o-cresyl) ether was indicated by chlorine analysis of the clear brown oil obtained.

Example 25

A mixture of 245 grams of diethylene glycol diphenyl ether $C_6H_5OC_2H_4OC_2H_4OC_6H_5$, 300 grams of dioxane, and 490 grams of 37% aqueous formaldehyde was stirred and saturated with gaseous hydrogen chloride for 16 hours at 40–60° C. The reaction mixture was poured into ice water and an oil layer separated. The oil was taken up in benzene, washed, dried, and the solvent removed in vacuo. The clear, amber oil was a mixture containing trichloromethyl diethylene glycol diphenyl ether and dichloromethyl diethylene glycol diphenyl ether.

Example 26

A mixture of 199 grams of 2,6-dichloro-4-ter.amyl phenoxyethoxyethoxy benzene

243 grams of 37% aqueous formaldehyde, and 200 grams of concentrated hydrochloric acid was stirred and saturated with gaseous hydrogen chloride at 40–60° C. for 8 hours. The oil layer was separated, taken up in benzene, washed, dried, and the solvent distilled off under reduced pressure. The residual oil was 2,6-dichloro-4-ter.amyl phenoxyethoxyethoxy chloromethyl benzene.

Example 27

A mixture of 140 grams of diisobutyl-phenoxy-ethoxyethoxyethyl dodecyl ether,

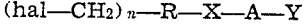

46 grams of 30% aqueous formaldehyde, and 200 grams of concentrated hydrochloric acid was stirred and saturated with gaseous hydrogen chloride at 45–55° C. for 25 hours. The oil layer was taken up in benzene, washed with ice water, dried with anhydrous sodium sulphate, and the solvent evaporated off under reduced pressure. The amber oil obtained was chloromethyl-diisobutyl-phenoxyethoxyethoxyethyl dodecyl ether.

This application is a continuation-in-part of United States application Serial No. 228,145, filed September 2, 1938, now U. S. Patent No. 2,266,737, issued December 23, 1941, in which there are claimed those compounds of the formula $$(hal—CH_2)_n—R—X—A—Y$$

wherein Y is chlorine or bromine. There are claimed herein those compounds in which Y is hydroxyl, oxyalkyl, or oxyaryl. The alkyl group may be a short or long chain, a branched or straight chain, such as methyl, ethyl, butyl, isobutyl, heptyl, octyl, isooctyl, dodecyl, cetyl, octadecyl, etc. As an aryl group there may be used any of the aromatic nuclei which have been described above as suitable for R, including aryl groups having halomethyl substituents.

We claim:

1. Compounds of the formula $$(hal—CH_2)_n—R—X—A—Y$$

wherein hal is a member of the group consisting of chlorine and bromine, n is an integer less than three, R is a carbocyclic aromatic radical, X is a member of the class consisting of oxygen and sulfur, A is an alkylene group, the chain of which may be interrupted by a member of the class consisting of oxygen and sulphur, and Y is a member of the group consisting of —OH, —O—alkyl, and —O—aryl.

2. Compounds of the general formula $$(ClCH_2)_n—R—O—A—Y$$

wherein n is an integer less than three, R is a carbocyclic aromatic radical, A is a polyalkylene ether chain, and Y is a member of the class consisting of —OH, —O—alkyl, and —O—aryl.

3. Compounds of the general formula $$(ClCH_2)_n—R—O—A—Y$$

wherein n is an integer less than three, R is a phenyl group, A is a polyalkylene ether chain and Y is a member of the class consisting of —OH, —O—alkyl, and —O—aryl.

4. A compound of the formula $$(ClCH_2)_n—R(OCH_2CH_2)_y—O—alkyl$$

wherein $n$ is an integer less than three, R is a phenyl group, and $y$ is an integer from one to ten inclusive.

5. A compound of the formula $$(ClCH_2)_n–R–O–CH_2CH_2–O–CH_2CH_2–O–alkyl$$

wherein $n$ is an integer less than three and R is a phenyl group.

6. A compound of the formula $$(ClCH_2)_n—R(OCH_2CH_2)_y—OH$$

wherein $n$ is an integer less than three, R is a phenyl group, and $y$ is an integer from one to ten inclusive.

7. A compound of the formula $$(ClCH_2)_n–R–O–CH_2CH_2–O–CH_2CH_2–O–C_{12}H_{25}$$

wherein $n$ is an integer less than three and R is a phenyl nucleus.

8. A compound of the formula $$(ClCH_2)_n–R–O–CH_2CH_2–O–CH_2CH_2–O–C_4H_9$$

wherein $n$ is an integer less than three and R is a phenyl nucleus.

9. A compound of the formula $$ClCH_2-C_6H_3(C_8H_{17})-O-CH_2CH_2-O-CH_2CH_2-O-C_4H_9$$

HERMAN A. BRUSON.
CLINTON W. MACMULLEN.